United States Patent
Yount et al.

(10) Patent No.: US 8,033,509 B2
(45) Date of Patent: Oct. 11, 2011

(54) LOAD OPTIMIZED REDUNDANT FLIGHT CONTROL SURFACE ACTUATION SYSTEM AND METHOD

(75) Inventors: Larry J. Yount, Scottsdale, AZ (US);
Casey Hanlon, Queen Creek, AZ (US);
Andrew T. Johnson, Scottsdale, AZ (US); Joseph Jackson, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 814 days.

(21) Appl. No.: 11/711,295

(22) Filed: Feb. 27, 2007

(65) Prior Publication Data

US 2008/0203224 A1     Aug. 28, 2008

(51) Int. Cl.
*B64C 13/40* (2006.01)
*B64C 13/42* (2006.01)
*B64C 13/50* (2006.01)

(52) U.S. Cl. .................. 244/194; 244/228; 244/99.4

(58) Field of Classification Search ........... 244/99.4, 244/99.9, 99.2, 99.5, 99.6, 99.14, 227, 228, 244/76 A, 82, 195, 194, 175
See application file for complete search history.

(56) References Cited

U.S. PATENT DOCUMENTS

| | | | |
|---|---|---|---|
| 2,665,084 A | 1/1954 | Feeney et al. | |
| 3,949,958 A | 4/1976 | Richter | |
| 4,470,569 A | 9/1984 | Shaffer et al. | |
| 4,498,647 A | 2/1985 | Boehringer et al. | |
| 4,688,744 A | 8/1987 | Aldrich | |
| 4,759,515 A | 7/1988 | Carl | |
| 4,800,798 A * | 1/1989 | Boldrin et al. ............... 91/361 |
| 4,905,933 A | 3/1990 | Ako | |
| 5,670,856 A * | 9/1997 | Le et al. ...................... 244/194 |
| 6,241,182 B1 * | 6/2001 | Durandeau et al. .......... 244/99.4 |
| 6,776,376 B2 | 8/2004 | Collins | |
| 6,827,311 B2 * | 12/2004 | Wingett et al. .............. 244/99.5 |
| 7,104,053 B2 * | 9/2006 | Gast ............................... 60/420 |
| 2004/0075019 A1 | 4/2004 | Collins | |
| 2004/0075020 A1 * | 4/2004 | Trikha ......................... 244/75 R |
| 2005/0051671 A1 | 3/2005 | Djuric | |
| 2005/0116095 A1 | 6/2005 | Cline et al. | |
| 2006/0043242 A1 * | 3/2006 | Benson ........................ 244/175 |

FOREIGN PATENT DOCUMENTS

EP    0 237 650 A1    9/1987

OTHER PUBLICATIONS

European Search Report Application No. 06113746.9, dated Sep. 5, 2006.
European Search Report Application No. 06113583.6, dated Sep. 1, 2006.

* cited by examiner

*Primary Examiner* — Tien Dinh
*Assistant Examiner* — Richard R Green
(74) *Attorney, Agent, or Firm* — Ingrassia Fisher & Lorenz, P.C.

(57) ABSTRACT

An aircraft flight surface control system and method simultaneously provides the benefits of both an active/active system architecture and in active/standby system architecture. The system is preferably implemented using hydraulic actuator assemblies and electromechanical actuator assemblies coupled to the same flight control surface. During normal system operations the electromechanical actuator assemblies are energized to supply a relatively minimal force to associated flight control surfaces. In effect, the electromechanical actuators, although energized, may be pulled along by the associated hydraulic actuator assemblies, until needed. Thus, the electromechanical actuator assemblies are controlled in a manner that closely resembles the active/standby architecture.

11 Claims, 4 Drawing Sheets

LOAD OPTIMIZED REDUNDANT FLIGHT CONTROL SURFACE ACTUATION SYSTEM AND METHOD

TECHNICAL FIELD

The present invention generally relates to aircraft flight control systems and, more particularly, an aircraft flight control system and method that simultaneously provides various benefits associated with both active/active redundancy architectures and active/standby redundancy architectures.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers.

The positions of the aircraft flight control surfaces are typically controlled using a flight control surface actuation system. The flight control surface actuation system, in response to position commands that originate from either the flight crew or an aircraft autopilot, moves the aircraft flight control surfaces to the commanded positions. In most instances, this movement is effected via actuators that are coupled to the flight control surfaces. Though unlikely, it is postulated that a flight control surface actuator could become jammed, uncontrollably free, or otherwise inoperable. Thus, some flight control surface actuation systems are implemented with redundant actuators coupled to a single flight control surface.

In many flight control surface actuation systems the actuators are hydraulically powered. With these systems, the aircraft typically includes two or three redundant hydraulic systems to power to the actuators, which ensures a sufficiently low probability of loss (e.g., $<10^{-9}$). It is presently a goal to reduce hydraulic system redundancy. One way that has postulated to meet this goal is to implement actuator redundancy using electrically-powered actuators as the redundant actuators. While this would seemingly be a straightforward solution, it nonetheless can present certain drawbacks, particularly with the concurrent on-going move to implement composite surfaces. More specifically, presently proposed composite surfaces can exhibit little ability to sink heat. As a result, coupling electrically and hydraulically powered actuators to the same surface can present difficulties. For example, using electrically and hydraulically powered actuators may result in increased weight as a result of the heat sinking that may be needed on the composite structure. This can be most pronounced when implementing an active/active system architecture, which typically provides reduced weight and enhanced fault suppression capability as compared to, for example, an active/standby architecture.

Hence, there is a need in the art for a system and method of implementing suitably redundant aircraft flight control surface actuation control that does not increase overall system weight and/or can be implemented with composite structures and/or that provides an adequately low probability of component loss. The present invention addresses one or more of these needs.

BRIEF SUMMARY

In one embodiment, and by way of example only, an aircraft flight control surface actuation system includes an electromechanical actuator assembly, a hydraulic actuator assembly, a hydraulic actuator control, and an electromechanical actuator control. The electromechanical actuator assembly is adapted to be selectively supplied with electrical current and, upon receipt of the electrical current, to supply a force. The hydraulic actuator assembly is adapted to selectively receive a supply of hydraulic fluid and, upon receipt of the hydraulic fluid, to supply a force. The hydraulic actuator control is adapted to receive a position command signal and is configured, in response thereto, to control the supply of hydraulic fluid to the hydraulic actuator assembly. The electromechanical actuator control is configured to determine whether the hydraulic actuator assembly is supplying an adequate amount of force and, based in part on this determination, to control the electrical current supplied to, and thus the force supplied by, the electromechanical actuator assembly.

In another exemplary embodiment, an aircraft includes a flight control surface, an electromechanical actuator assembly, a hydraulic actuator assembly, a hydraulic actuator control, and an electromechanical actuator control. The flight control surface is coupled to receive a force from one or more sources and is configured, upon receipt of the force, to move. The electromechanical actuator assembly is adapted to be selectively supplied with electrical current and, upon receipt of the electrical current, to supply a first force to the flight control surface. The hydraulic actuator assembly is adapted to selectively receive a supply of hydraulic fluid and, upon receipt of the hydraulic fluid, to supply a second force to the flight control surface. The hydraulic actuator control is adapted to receive a position command signal and is configured, in response thereto, to control the supply of hydraulic fluid to the hydraulic actuator assembly. The electromechanical actuator control is configured to determine whether the second force supplied by the hydraulic actuator assembly is an adequate amount of force and, based in part on this determination, to control the electrical current supplied to, and thus the first force supplied by, the electromechanical actuator assembly.

In yet another exemplary embodiment, a method of moving a flight control surface having a hydraulic actuator assembly and an electromechanical actuator assembly coupled thereto includes supplying a force to the flight control surface from the hydraulic actuator assembly, and supplying a force to the flight control surface from the electromechanical actuator assembly. A determination is made as to whether the hydraulic actuator assembly is supplying an adequate amount of force to the flight control surface. The force supplied from the electromechanical actuator assembly to the flight control surface is controlled based partially on the determination of whether the hydraulic actuator assembly is supplying sufficient force to the flight control surface.

Other independent features and advantages of the preferred flight control surface actuation system and method will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description.

Figure 1:
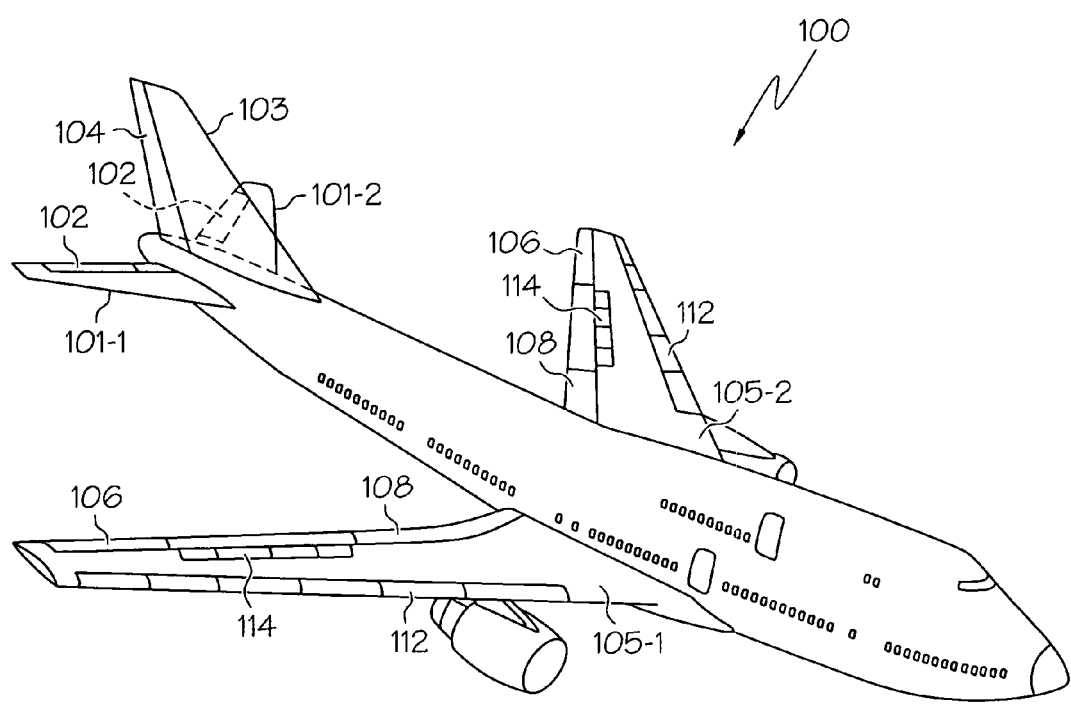
FIG. 1 is a plan view of an exemplary aircraft depicting primary and secondary flight control surfaces.

Turning first to FIG. 1, a perspective view of an exemplary aircraft is shown. In the illustrated embodiment, the aircraft 100 includes first and second horizontal stabilizers 101-1 and 101-2, respectively, a vertical stabilizer 103, and first and second wings 105-1 and 105-2, respectively. An elevator 102 is disposed on each horizontal stabilizer 101-1, 101-2, a rudder 104 is disposed on the vertical stabilizer 103, and an aileron 106 is disposed on each wing 105-1, 105-2. In addition, a plurality of flaps 108, slats 112, and spoilers 114 are disposed on each wing 105-1, 105-2. The elevators 102, the rudder 104, and the ailerons 106 are typically referred to as the primary flight control surfaces, and the flaps 108, the slats 112, and the spoilers 114 are typically referred to as the secondary flight control surfaces.

The primary flight control surfaces 102-106 control aircraft movements about the aircraft pitch, yaw, and roll axes. Specifically, the elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved by varying the thrust levels from the engines on opposing sides of the aircraft 100. The aircraft 100 additionally includes horizontal stabilizers 101-1, 101-2.

The secondary control surfaces 108-114 influence the lift and drag of the aircraft 100. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend more steeply for a given airspeed, and also enable the aircraft 100 get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

Figure 2:
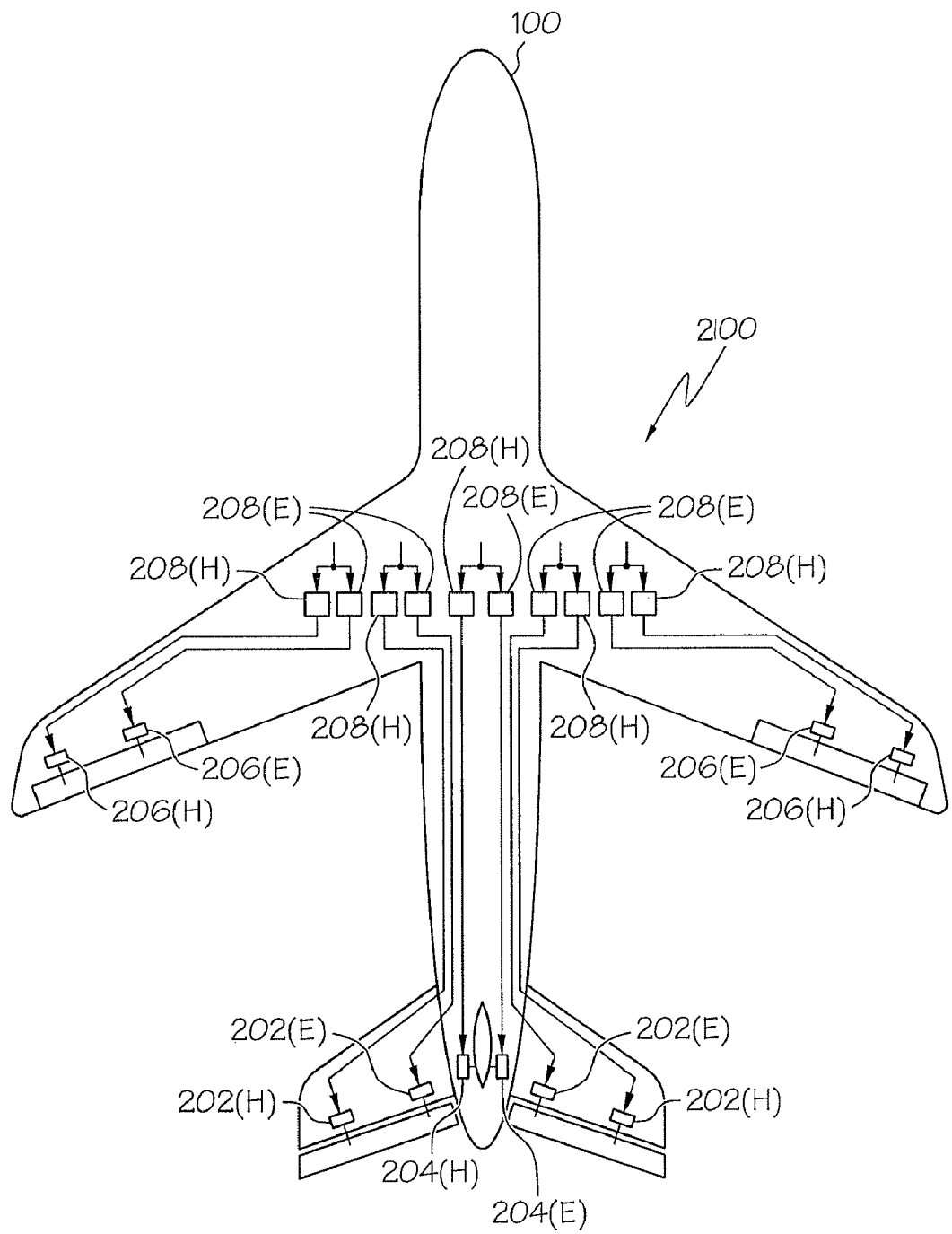
FIG. 2 is a schematic diagram depicting portions of an exemplary flight control surface actuation system according to one embodiment of the present invention.

The flight control surfaces 102-114 are moved to commanded positions via a flight control surface actuation system 200, an exemplary embodiment of which is shown in FIG. 2. In the depicted embodiment, the flight control surface actuation system 200 includes a plurality of primary flight control surface actuator assemblies, which include elevator actuator assemblies 202, rudder actuator assemblies 204, and aileron actuator assemblies 206, and a plurality of actuator controls 208.

Before proceeding further, it is noted that the flight control surface actuation system 200 additionally includes a plurality of secondary control surface actuator assemblies, such as flap actuator assemblies, slat actuator assemblies, and spoiler actuator assemblies. However, the operation of the secondary flight control surfaces 108-114 and the associated actuator assemblies is not needed to fully describe and enable the present invention. Thus, for added clarity, ease of description, and ease of illustration, the secondary flight control surfaces and actuator assemblies are not depicted in FIG. 2, nor are these devices further described.

Returning now to the description, it will be appreciated that the flight control surface actuation system 200 may be implemented using various numbers and types of primary flight control surface actuator assemblies 202-206. In addition, the number and type of primary flight control surface actuator assemblies 202-206 per primary flight control surface 102-106 may be varied. In the depicted embodiment, however, the flight control surface actuation system 200 is implemented such that two primary flight control surface actuator assemblies 202-206 are coupled to each primary flight control surface 102-106, with one of the actuator assemblies being a hydraulic actuator assembly 202(H), 204(H), 206(H) and the other actuator assembly being an electromechanical actuator assembly 202(E), 204(E), 206(E). It will be appreciated that this number and type of primary flight control surface actuator assemblies 202-206 are merely exemplary of a particular embodiment, and that other numbers and types of actuator assemblies 202-206 could also be used. It will additionally be appreciated that the configuration of each pair of hydraulic 202(H)-206(H) and electromechanical actuator assemblies 202(E)-206(E) is coupled to each primary flight control surface 102-106 may vary. Preferably, however, each pair is configured as disclosed in either application Ser. No. 11/192,625, entitled "Flight Control Surface Actuation System with Redundantly Configured and Lockable Actuator Assemblies," or application Ser. No. 11/193,059, entitled "Flight Control Surface Actuation System with Redundantly Configured Actuator Assemblies," both of which were filed on Jul. 28, 2005, and both of which are assigned to the Assignee of the instant application.

The flight control surface actuation system 200 may also be implemented with various numbers of actuator controls 208. However, the flight control surface actuation system 200 is preferably implemented such that each primary flight control surface actuator assembly 204-208 is controlled by at least one actuator control 208. Thus, at least in the depicted embodiment, the flight control surface actuation system 200 includes ten actuator controls 208. Each actuator control that controls one of the hydraulic actuator assemblies 202(H), 204(H), 206(H) is implemented as a hydraulic actuator control 208(H), and an actuator control that controls one of the electromechanical actuator assemblies 202(E), 204(E), 206(E) is implemented as an electromechanical actuator control 208(E). It will be appreciated that, although the actuator controls 208 are depicted as being disposed remote from the associated actuator assemblies 202-206, some or all of the actuator controls 208 could be collocated or integral with the associated actuator assemblies 202-206.

No matter its specific implementation, each actuator control 208 is preferably configured, during normal system 200 operation, to operate in an active mode. Thus, each actuator control 208 is configured to receive flight control surface position commands from one or more non-illustrated external systems, such as a flight control computer or pilot controls. In response to the flight control surface position commands, each actuator control 208 appropriately controls its associated flight control surface actuator assembly 202-206 to supply a force to its associated flight control surface 102-106 that moves the associated flight control surface 102-106 to the commanded position. Although each actuator control 208 operates in an active mode during normal operation, the actuator controls 208 are further configured such that under relatively low load conditions the hydraulic actuator assemblies 202(H), 204(H), 206(H) and electromechanical actuator assemblies 202(E), 204(E), 206(E) will both supply force to the primary flight control surfaces 102-106. Preferably, under these relatively low load conditions the force supplied from each actuator assembly 202-206 (H, E) is equal, or at least substantially equal. However, if the load on the actuator assemblies 202-206 exceeds a predetermined amount, then the force supplied by the hydraulic actuator assemblies 202(H), 204(H), 206(H) will increase, and supply the majority of the force to the primary flight control surfaces 102-106. Moreover, if one or more of the hydraulic actuator assemblies 202(H), 204(H), 206(H) is inoperable or otherwise unable to supply an adequate amount of force to its associated flight control surface 102-106, then the force supplied by the associated electromechanical actuator assembly 202(E), 204(E), 206(E) will increase. It will be appreciated that the actuator controllers 208 may be variously configured to implement this functionality. However, with reference now to FIGS. 3 and 4, a particular preferred configuration will be described.

Figure 3:
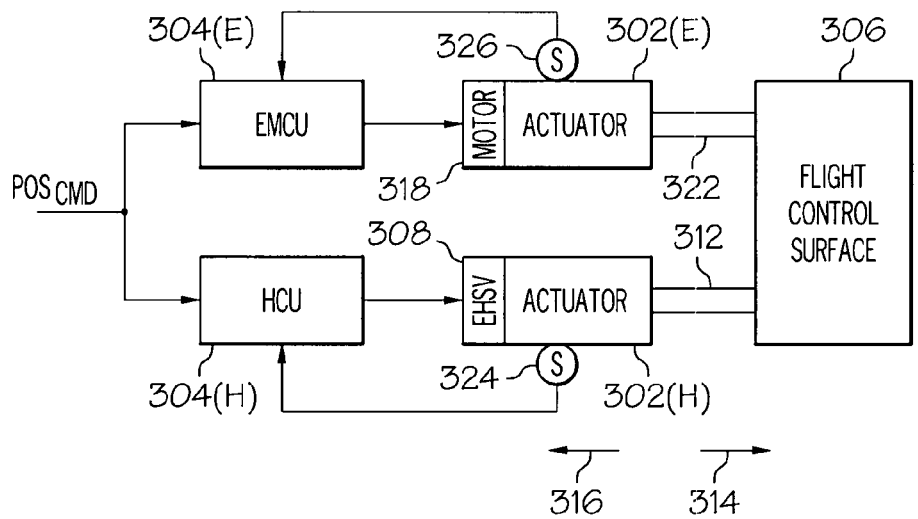
FIG. 3 is a function block diagram of exemplary actuation controls for a single aircraft flight control surface that may be used in the system of FIG. 2.
Figure 4:
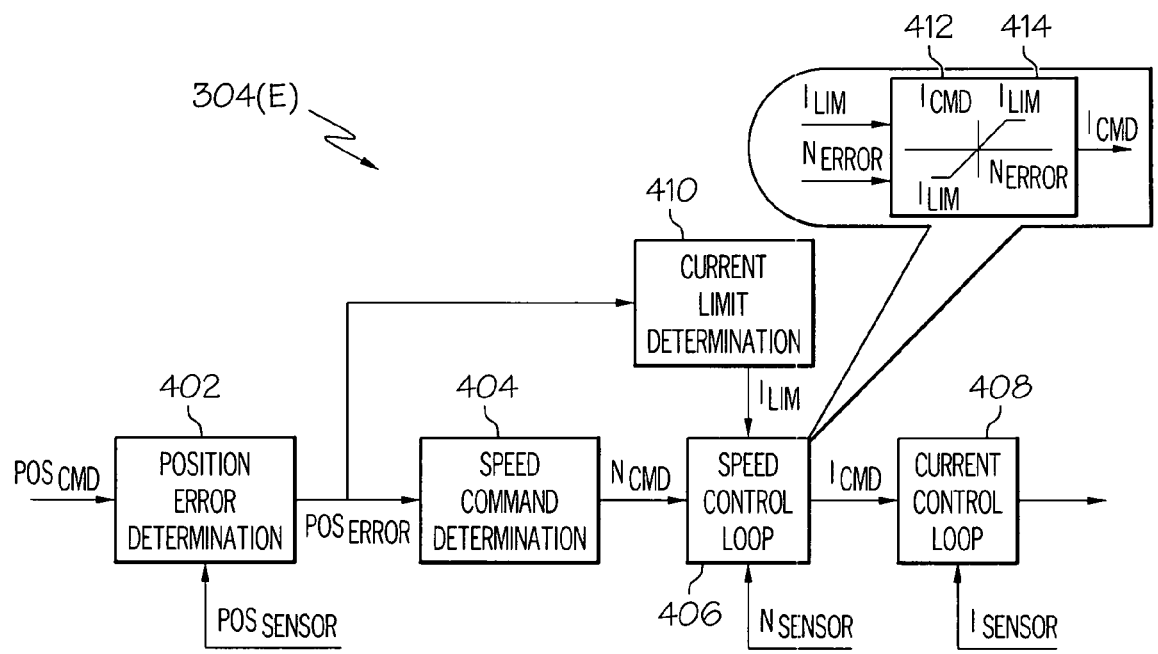
FIG. 4 is a functional block diagram of an exemplary electromechanical actuator control that may be used to implement the controls in FIG. 3.

Referring first to FIG. 3, a functional block diagram of the actuator assemblies 302 and actuator controls 304 associated with a single primary flight control surface 306 is depicted. The actuator assemblies 302, as described above, include a hydraulic actuator assembly 302(H) and an electromechanical actuator assembly 302(E), both of which are coupled to the same primary flight control surface 306. The hydraulic actuator assembly 302(H) may be implemented using any one of numerous types of hydraulic actuator assemblies. In the depicted embodiment, the hydraulic actuator assembly 302(H) includes a servo control valve 308 and an actuator 312. The servo control valve 308, which is implemented as an electro-hydraulic servo valve (EHSV) in the depicted embodiment, is configured, when appropriately energized, to control the supply of pressurized hydraulic fluid to and from the actuator 312. The actuator 312, depending on the position of the EHSV 308 and in response to the pressurized hydraulic fluid, moves in either an extend direction 314 or a retract direction 316, and thereby supplies a force to the flight control surface 306. It will be appreciated that the hydraulic actuator assemblies 302(H) could additionally be implemented as electrohydraulic actuator assemblies (EHAs), which do not include servo valves.

The electromechanical actuator assembly 302(E) may similarly be implemented using any one of numerous types of electromechanical actuator assemblies. In the depicted embodiment the electromechanical actuator assembly 302(E) includes an electric motor 318 and an actuator 322. The electric motor 318, which is preferably a brushless DC motor, is configured, when appropriately energized, to rotate and supply a rotational drive force to the actuator 322. The actuator, depending on the rotational direction of the motor 318 and in response to the rotational drive force, moves in the extend direction 314 or the retract direction 316, and thereby also supplies a force to the control surface 306. It will be appreciated that in other embodiments, the actuator 322 may be implemented as a rotary actuator, and would thus be configured to rotate in either a first direction or a second direction.

The actuator controls 304, as also described above, include a hydraulic actuator control (HCU) 304(H) and an electromechanical actuator control (EMCU) 304(E). The HCU and EMCU 304(H), 304(E) both receive the same position command ($POS_{CMD}$). The HCU 304(H), in response to the position command, appropriately energizes the EHSV 308 such that the EHSV 308 causes pressurized hydraulic fluid to flow to and from the actuator 312 in a manner that causes it to move in the appropriate direction toward the commanded position. One or more hydraulic actuator assembly sensors 324 are coupled to the hydraulic actuator assembly 302(H) and supply feedback signals representative of one or more parameters to the HCU 304(H). It will be appreciated that the feedback signals supplied from the hydraulic actuator assembly sensors 324 may vary, and may include, for example, hydraulic actuator position and/or speed. It will additionally be appreciated that the sensors 324 may instead be coupled to the associated control surfaces.

Similarly, the EMCU 304(E), in response to the position command, appropriately energizes the motor 318 such that the motor 318 rotates in a direction that causes the actuator 322 to move in the appropriate direction toward the commanded position. One or more electromechanical actuator assembly sensors 326 are coupled to the electromechanical actuator assembly 302(E) and supply one or more feedback signals representative of one or more parameters to the EMCU 304(E). As with the feedback signals supplied to the HMU 304(H), the feedback signals supplied from the electromechanical actuator assembly sensors 326 may vary, and may include, for example, electromechanical actuator position and/or speed and/or motor current. It will additionally be appreciated that the sensors 326 may instead be coupled to the associated control surfaces.

The EMCU 304(E), in addition to appropriately energizing the motor 318 to rotate in the appropriate direction, also determines whether the hydraulic actuator assembly 302(H), either by itself or preferably in combination with the electromechanical actuator assembly 302(E), is supplying an adequate amount of force to the flight control surface 306. The EMCU 304(E), based in part on this determination, controls the electrical current supplied to the motor 318, and thus the force supplied by the electromechanical actuator assembly 302(E) to the flight control surface 306. In this manner, as was noted above, the hydraulic actuator assembly 302(H) and the electromechanical actuator assembly 302(E) normally supply an equal amount of force to the flight control surface 306. However, if the combined load on the actuator assemblies 302(H), 302(E) exceeds a predetermined amount, then the force supplied by the hydraulic actuator assembly 302(H) increases. Moreover, if the hydraulic actuator assembly 302(H) is, at any time, inoperable or otherwise unable to supply an adequate amount of force, then the force supplied by the electromechanical actuator assembly 302(E), will increase so that either the electromechanical actuator assembly 302(E) itself, or together with the hydraulic actuator assembly 302(H), will supply an adequate amount of force. It will be appreciated that the electromechanical actuator assembly 302(E), during normal operations, is at least supplied with current of a magnitude sufficient to maintain the electromechanical actuator assembly 302(E) above a predetermined temperature for warmth. Moreover, the current supplied to the electromechanical actuator assembly 302(E) during normal system operations is preferably of a magnitude that is sufficient to provide some assistance to the hydraulic actuator assembly 302(H), to thereby minimize the fatigue sizing of the hydraulic actuator assembly 302(H). It will additionally be appreciated that the EMCU 304(E) may be configured in any one of numerous manners, using any one of numerous control laws and techniques, to implement this functionality. However, a particular EMCU 304(E) configuration is depicted in functional block diagram form in FIG. 4, and with reference thereto will now be described in more detail.

The EMCU 304(E), at least in the depicted embodiment, includes a position error determination function 402, a speed command determination function 404, a speed control loop 406, a current control loop 408, and a current limit determination function 410. The position error determination function 402 receives the position command signal ($POS_{CMD}$) and a position sensor signal ($POS_{SENSOR}$). The position sensor signal is supplied from a position sensor that comprises one of the above-mentioned electromechanical actuator assembly sensors 326, and is representative of electromechanical actuator assembly position. The position sensor, which may be implemented using any one of numerous suitable types of sensors, is configured to sense the position of the electromechanical actuator assembly and supply the position sensor signal ($POS_{SENSOR}$) to at least the position error determination function 402. It will be appreciated that the position sensor signal could be supplied from one or more other position sensors, in addition to or instead of the electromechanical actuator position sensor. For example, a position sensor configured to sense the position of the flight control surface 306 could also be used.

No matter the specific type and source of the position sensor signal, the position error determination function 402, in response to the position command signal and the position sensor signal, determines a position error and supplies a position error signal ($POS_{ERROR}$) representative thereof to both the speed command determination function 404 and the current limit determination function 410. The position error associated with the electromechanical actuator assembly 302 (E), at least in the depicted embodiment, is used to determine whether the hydraulic actuator assembly 302(H) is supplying an adequate amount of force to the flight control surface 306. More specifically, if the hydraulic actuator assembly 302(H) is supplying an adequate amount of force, the position error will be relatively small. Conversely, if the hydraulic actuator assembly 302(H) is not supplying an adequate amount of force, the position error will increase. As will be described in more detail further below, if the position error reaches a predetermined magnitude, the current magnitude supplied to the electromechanical actuator assembly motor 318 will increase. It will be appreciated that the position error determination function 402 may be implemented using any one of numerous configurations suitable for implementing this function.

As noted above, the position error signal ($POS_{ERROR}$) is supplied to the speed command determination function 404. The speed command determination function 404, in response to the position error signal, generates and supplies a speed command signal ($N_{CMD}$) that is representative of a commanded electromechanical actuator assembly movement speed. The speed command determination function 404 may be implemented using any one of numerous configurations for implementing this function. No matter the particular manner in which the speed command determination function 404 implements the described functionality, the speed command signal ($N_{CMD}$) it generates is supplied to the speed control loop 406.

The speed control loop 406 receives the speed command signal ($N_{CMD}$) from the speed command determination function 404, a speed sensor signal ($N_{SENSOR}$), and a current limit signal ($I_{LIM}$). The speed sensor signal is supplied from a speed sensor that comprises one of the above-mentioned electromechanical actuator assembly sensors 326, and is representative of electromechanical actuator assembly movement speed (either linear or rotational, depending on the type of actuator 322). The speed sensor, which may be implemented using any one of numerous suitable types of sensors, is configured to sense the movement speed of the electromechanical actuator assembly and supply the speed sensor signal ($N_{SENSOR}$) to the speed control loop 406. It will be appreciated that the speed sensor signal could be supplied from one or more other speed sensors, in addition to or instead of the electromechanical actuator speed sensor, or it could be derived from the position sensor signal ($POS_{SENSOR}$).

No matter the specific type and source of the speed sensor signal, the speed control loop 406, in response to the speed command signal ($N_{CMD}$) and the speed sensor signal ($N_{SENSOR}$), determines a speed error and supplies a speed error signal ($N_{ERROR}$) representative of the determined speed error to a current command determination function 412. As FIG. 4 further depicts, the current command determination function 412, at least in the depicted embodiment, is implemented in the speed control loop 406. The current command determination function 412 is configured to determine and supply a current command signal ($I_{CMD}$) representative of the electrical current to be supplied to the electromechanical actuator assembly motor 318. More specifically, the current command determination function 412 implements a current-magnitude-limited current command versus speed error function 414, with the current magnitude limits established based on the current limit signal ($I_{LIM}$) supplied from the current limit determination function 410. The current limit determination function 410 is described in more detail further below. However, it is seen that the current command signal ($I_{CMD}$) is supplied to the current control loop 408.

The current control loop 408 is coupled to receive the current command signal ($I_{CMD}$) and an actuator current sensor signal ($I_{SENSOR}$) representative of the current supplied to the electromechanical actuator assembly 302(E). The current sensor signal is supplied from one or more current sensors that comprise one of the above-mentioned electromechanical actuator assembly sensors 326, and is representative of the current being supplied to electromechanical actuator assembly. The current sensor, which may be implemented using any one of numerous suitable types of sensors, is configured to sense the current being supplied to the electromechanical actuator assembly and supply the current sensor signal ($I_{SENSOR}$) to at least the current control loop 408.

No matter the specific type and source of the current sensor signal, the current control loop 408, in response to the current command signal ($I_{CMD}$) and the current sensor signal ($I_{SENSOR}$), energizes the electromechanical actuator assembly with a voltage (V) or duty cycle that causes the commanded electrical current ($I_{CMD}$) to be supplied to the electromechanical actuator assembly 302(E). It will be appreciated that the current control loop 408 may implement this function using any one of numerous known current control configurations. In the depicted embodiment, however, the current control loop 408 compares the current command signal ($I_{CMD}$) and the current sensor signal ($I_{SENSOR}$) to determine, and supply a signal representative of, a current error. The current error signal is supplied to a voltage versus current error function, which determines the voltage (V) or duty cycle with which the electromechanical actuator assembly 302(E) should be energized to cause the commanded current be supplied thereto.

Figure 5:
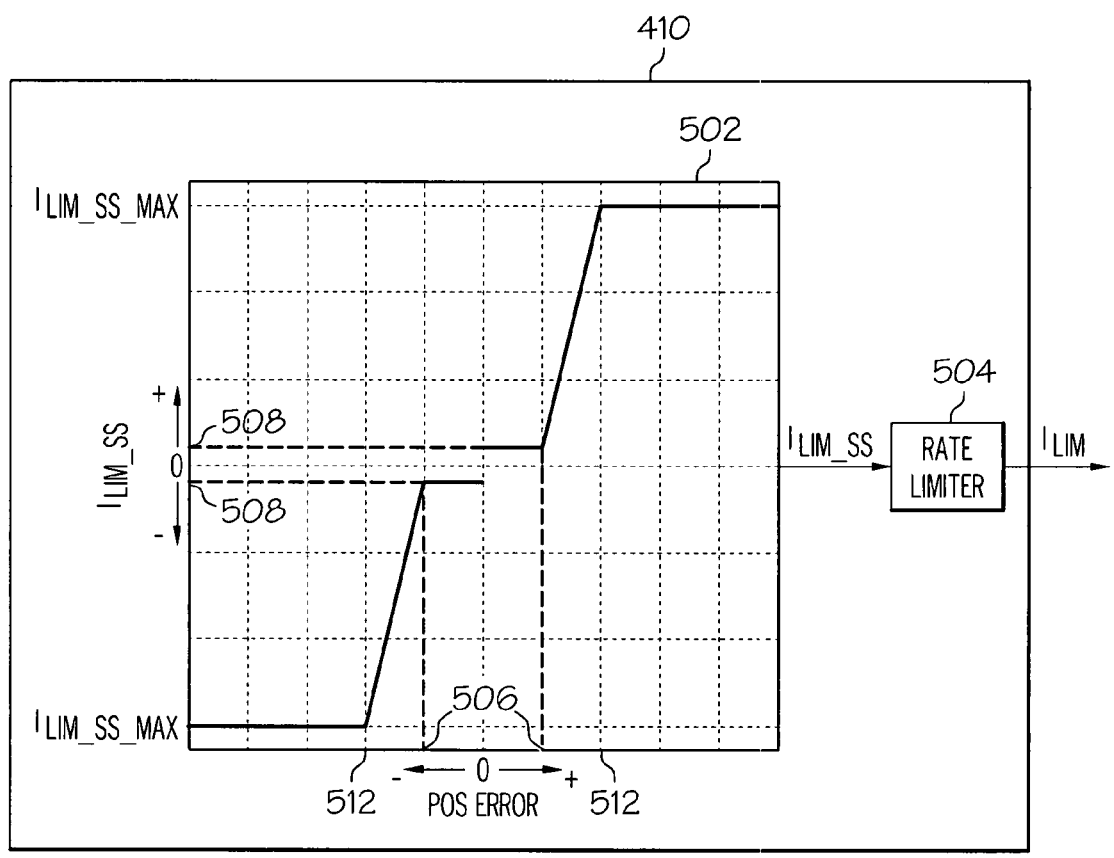
FIG. 5 is a functional block diagram of an exemplary current limit determination function that may be used to implement the exemplary electromechanical actuator control of FIG. 4.

The current limit determination function 410, as has been previously mentioned, receives the position error signal ($POS_{ERROR}$) from the position error determination function 402 and, in response, supplies the current limit signal ($I_{LIM}$) to the current command determination function 412 in the speed control loop 406. As was described above, the current command signal ($I_{CMD}$) supplied by the current command determination function 412 is limited to current magnitudes represented by the current limit signal ($I_{LIM}$). The current limit determination function 410 may be configured in any one of numerous manners, using any one of numerous techniques, to implement its functionality. However, in a particular configuration the current limit determination function implements a current limit versus position error function 502, which is depicted more clearly in FIG. 5, and with reference thereto will now be described.

The current limit versus position error function 502 establishes the current limit signal ($I_{LIM}$) based on the position error signal ($POS_{ERROR}$). More specifically, the current limit versus position error function 502 receives the position error and the sign of the position error (i.e., positive or negative) and, based on these data, determines a steady-state current limit value ($I_{LIM\_SS}$), which is representative of the maximum steady-state current magnitude that should be supplied to the electromechanical actuator assembly 302(E). The steady-state current limit value ($I_{LIM\_SS}$) is preferably supplied to a rate limiter 504, which limits the rate of change of the steady-state current limit value ($I_{LIM\_SS}$). The output of the rate limiter 504 is the current limit signal ($I_{LIM}$), which is supplied to the current command determination function 412 in the speed control loop 406. In accordance with the embodiment depicted in FIG. 5, when the determined position error is zero or below first predetermined error magnitude 506, the steady state current limit ($I_{LIM\_SS}$) is a relatively small, predetermined low-load current magnitude 508. As previously noted, this magnitude is sufficient to maintain the electromechanical actuator assembly 302(E) above a predetermined temperature and to provide some assistance to the hydraulic actuator assembly 302(H). If, however, the position error exceeds this predetermined error magnitude 506, the steady state current limit ($I_{LIM\_SS}$) increases. In the depicted embodiment, the steady state current limit ($I_{LIM\_SS}$) increases with the position error, at least until the position error reaches a second predetermined position error 512. At the second predetermined position error 512, a maximum steady state current limit ($I_{LIM\_SS\_MAX}$) value is reached. Thus, the maximum steady state current limit ($I_{LIM\_SS\_MAX}$) is supplied for all position error magnitudes that exceed the second predetermined position error 512.

The system 100 described herein simultaneously provides the benefits of both an active/active architecture and an active/standby architecture. In particular, during normal system 100 operations the electromechanical actuator assemblies 202(E)-206(E) supply minimal force to the associated flight control surfaces 102-106. If the associated load is relatively low, the electromechanical actuator assemblies 202(E)-206(E) and the hydraulic actuator assemblies 202(H)-206(H) supply substantially equal forces to the flight control surfaces 102-106. But under normal conditions, the electromechanical actuator assemblies 202(E)-206(E) are in saturation and are, in effect, being pulled along by the associated hydraulic actuator assemblies 202(H)-206(H). Thus, the electromechanical actuator assemblies 202(E)-206(E) are controlled in a manner that resembles the active/standby architecture, until otherwise needed. More specifically, when the electromechanical actuator assemblies 202(E)-206(E) and associated hydraulic actuator assemblies 202(H)-208(H) are tracking, the electromechanical actuator assemblies 202(E)-206(E) allow the associated hydraulic actuator assemblies 202(H)-206(H) to provide the majority of force/torque to the associated flight control surfaces 102-106. However, if the deviation in commanded position to actual (or sensed) position becomes too great for a particular electromechanical actuator assembly 202(E)-206(E), indicating that the associated hydraulic actuator assembly 202(H)-206(H) is not supply an adequate amount of force to the flight control surface 102-106, the electrical current supplied to that electromechanical actuator assembly 202(E)-208(E) is increased. Thus, the force supplied from the electromechanical actuator assemblies 202(E)-208(E) to the associated flight control surfaces 102-106 is controlled based, at least partially, on the determination of whether the associated hydraulic actuator assemblies 202(H)-206(H) are supplying an adequate amount of force to the associated flight control surfaces 102-106.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft flight control surface actuation system, comprising:
    an electromechanical actuator assembly adapted to be selectively supplied with electrical current and, upon receipt of the electrical current, to supply a force to a flight control surface;
    a hydraulic actuator assembly adapted to selectively receive a supply of hydraulic fluid and, upon receipt of the hydraulic fluid, to supply a force to the flight control surface;
    a hydraulic actuator control adapted to receive a position command signal representative of a commanded flight control surface position and operable, in response thereto, to control the supply of hydraulic fluid to the hydraulic actuator assembly; and
    an electromechanical actuator control operable to control the electrical current supplied to, and thus the force supplied by, the electromechanical actuator assembly, the electromechanical actuator control including:
        a position error determination function, the position error determination function adapted to receive (i) the position command signal and (ii) a position sensor signal representative of at least electromechanical actuator assembly position and operable, in response to the position command signal and the position sensor signal, to (i) determine a position error representative of a difference between the commanded flight control surface position and the electromechanical actuator assembly position and (ii) supply a position error signal representative of the position error, and
        a current limit determination function, the current limit determination function coupled to receive the position error signal and operable, in response thereto, to determine a current limit value, the current limit value representative of a maximum magnitude of the electrical current that the electromechanical actuator control supplies to the electromechanical actuator assembly, wherein the current limit value is (i) a non-zero predetermined current magnitude when a magnitude of the position error is less than or equal to a first predetermined error magnitude, and (ii) greater than the non-zero predetermined current magnitude when the magnitude of the position error is greater than the first predetermined error magnitude.

2. The system of claim 1, wherein:
the current limit determination function is further operable to supply a current limit signal representative of the determined current limit value; and
the electromechanical actuator control further comprises a current command determination function, the current command determination function coupled to receive the current limit signal and operable, based partially thereon, to supply a current command signal representative of a commanded electrical current to be supplied to the electromechanical actuator assembly.

3. The system of claim 2, wherein:
the electromechanical actuator control further comprises a current control loop, the current control loop coupled to receive (i) the current command signal and (ii) an actuator current sensor signal representative of the electrical current supplied to the electromechanical actuator assembly and operable, in response to the current command signal and the actuator current sensor signal, to energize the electromechanical actuator assembly with a voltage or duty cycle that causes the commanded electrical current to be supplied to the electromechanical actuator assembly.

4. The system of claim 3, wherein:
the electromechanical actuator control further comprises a speed command determination function, the speed command determination function coupled to receive the position error signal and operable, in response thereto, to supply the speed command signal.

5. The system of claim 2, wherein:
the electromechanical actuator control further comprises a speed control loop that includes the current command determination function, the speed control loop coupled to receive a speed command signal representative of a commanded actuator assembly movement speed and the speed sensor signal, and responsive thereto to (i) determine a speed error and (ii) supply a speed error signal representative of the determined speed error; and
the current command determination function is further coupled to receive the speed error signal and is operable to supply the current command signal based on the current limit signal and the speed error signal.

6. The system of claim 1, wherein:
the hydraulic actuator control is responsive to the position command signal to supply valve control signals; and
the hydraulic actuator assembly comprises a servo control valve coupled to receive the valve control signals and operable, in response thereto, to control receipt of the supply of hydraulic fluid.

7. The system of claim 1, wherein the electromechanical actuator assembly comprises:
an electric motor adapted to be selectively supplied with the electrical current and, upon receipt of the electrical current, to supply a rotational drive force; and
an actuator coupled to receive the rotational drive force from the electric motor and, in response thereto, to supply the force to the flight control surface.

8. An aircraft, comprising:
a flight control surface coupled to receive a force from one or more sources and operable, upon receipt of the force, to move;
an electromechanical actuator assembly adapted to be selectively supplied with electrical current and, upon receipt of the electrical current, to supply a first force to the flight control surface;
a hydraulic actuator assembly adapted to selectively receive a supply of hydraulic fluid and, upon receipt of the hydraulic fluid, to supply a second force to the flight control surface;
a hydraulic actuator control adapted to receive a position command signal and operable, in response thereto, to control the supply of hydraulic fluid to the hydraulic actuator assembly; and
an electromechanical actuator control operable to control the electrical current supplied to, and thus the first force supplied by, the electromechanical actuator assembly, the electromechanical actuator control including:
a position error determination function, the position error determination function adapted to receive (i) the position command signal and (ii) a position sensor signal representative of at least electromechanical actuator assembly position and operable, in response to the position command signal and the position sensor signal, to (i) determine a position error representative of a difference between the commanded flight control surface position and the electromechanical actuator assembly position and (ii) supply a position error signal representative of the position error, and
a current limit determination function, the current limit determination function coupled to receive the position error signal and operable, in response thereto, to determine a current limit value, the current limit value representative of a maximum magnitude of the electrical current that the electromechanical actuator control supplies to the electromechanical actuator assembly, wherein the current limit value is (i) a non-zero predetermined current magnitude when a magnitude of the position error is less than or equal to a first predetermined error magnitude, and (ii) greater than the non-zero predetermined current magnitude when the magnitude of the position error is greater than the first predetermined error magnitude.

9. The system of claim 8, wherein:
the current limit determination function is further operable to supply a current limit signal representative of the determined limit value; and
the electromechanical actuator control further comprises a current command determination function, the current command determination function coupled to receive the current limit signal and operable, based partially thereon, to supply a current command signal representative of a commanded electrical current to be supplied to the electromechanical actuator assembly.

10. The system of claim 9, wherein:
the current limit determination function is further coupled to receive a speed error signal and is operable to supply a current command signal based on the current limit signal and the speed error signal; and the electromechanical actuator control further comprises:
- a speed command determination function coupled to receive the position error signal and operable, in response thereto, to supply a speed command signal representative of a commanded actuator assembly movement speed,
- a speed control loop that includes the current limit determination function, the speed control loop coupled to receive the speed command signal and the speed sensor signal, and responsive thereto to supply the speed error signal to the current limit determination function, and
- a current control loop coupled to receive (i) the current command signal and (ii) an actuator current sensor signal representative of the electrical current supplied to the electromechanical actuator assembly and operable, in response to the current command signal and the actuator current sensor signal, to energize the electromechanical actuator assembly with a voltage or duty cycle having a magnitude that causes the commanded electrical current to be supplied to the electromechanical actuator assembly.

11. A method of moving a flight control surface having a hydraulic actuator assembly and an electromechanical actuator assembly coupled thereto, the method comprising the steps of:

supplying a position command to both the hydraulic actuator assembly and the electromechanical actuator assembly;

controlling a supply of hydraulic fluid to the hydraulic actuator assembly in response to the position command, whereby the hydraulic actuator supplies a force to the flight control surface;

controlling a supply of electrical current to the electromechanical actuator assembly in response to the position command, whereby the electromechanical actuator supplies a force to the flight control surface;

determining a position of at least the electromechanical actuator assembly;

comparing the position command to the determined position to determine a position error;

determining a current limit value based on the determined position error, the current limit value representative of a maximum magnitude of the electrical current that may be supplied to the electromechanical actuator assembly, and limiting the supply of electrical current to the electromechanical actuator assembly to the current limit value, wherein the current limit value is (i) a non-zero predetermined current magnitude when a magnitude of the position error is less than or equal to a first predetermined error magnitude, and (ii) greater than the non-zero predetermined current magnitude when the magnitude of the position error is greater than the first predetermined error magnitude.

* * * * *